Feb. 6, 1968     W. H. BROWN ETAL     3,367,708

EXPANDABLE CAMPING TRAILER

Filed April 4, 1966     3 Sheets-Sheet 1

INVENTORS
WILLIAM H. BROWN
CARL F. DRETZKE
TED J. NIEMCZYK
BY *Joseph G. Werner*

Feb. 6, 1968     W. H. BROWN ETAL     3,367,708

EXPANDABLE CAMPING TRAILER

Filed April 4, 1966     3 Sheets-Sheet 2

INVENTORS
WILLIAM H. BROWN
CARL F. DRETZKE
TED J. NIEMCZYK
BY *Joseph G. Werner*

INVENTORS
WILLIAM H. BROWN
CARL F. DRETZKE
TED J. NIEMCZYK

United States Patent Office 3,367,708
Patented Feb. 6, 1968

3,367,708
EXPANDABLE CAMPING TRAILER
William H. Brown, Carl F. Dretzke, and Ted J. Niemczyk, Manawa, Wis., assignors to Trade Winds Company, Inc., a corporation of Wisconsin
Filed Apr. 4, 1966, Ser. No. 539,822
3 Claims. (Cl. 296—27)

ABSTRACT OF THE DISCLOSURE

An expandable camping trailer having a rigid trailer body and a rigid, raisable trailer top supported on a pair of front arms and a pair of rear arms. Each arm has an upper and lower section pivotally pinned together so that the arms can be folded down into the front and rear walls of the trailer body perpendicular to the path of travel of the trailer. The upper sections of either the front pair of arms or the rear pair, or both pairs, are also pivotable on the connecting pins toward the other pair of arms parallel to the path of travel of the trailer so that one end of the trailer top can be raised at a time by one person.

---

This invention relates generally to camping trailers and more particularly to an expandable camping trailer having a substantially rigid, raisable top.

An object of our invention is to provide a new and improved expandable camping trailer having a substantially rigid, raisable top and extensible members for supporting said top wherein the extensible members are collapsible into the front and rear ends of the trailer body.

Another object of our invention is to provide an expandable camping trailer having a substantially rigid top which is supported on extensible members and is movable between an upper open position and a lower closed position and wherein the trailer has a door in the side of the trailer body which can be opened when the trailer top is in either its opened or closed position.

Another object of our invention is to provide an expandable camping trailer having a substantially rigid, raisable top which is supported by a pair of extensible front members and a pair of extensible rear members for movement between an upper open position and a lower closed position and wherein the front pair of extensible members can be folded into a space between the inner and outer front walls of the trailer body and the rear pair of extensible members can be folded into a space between the inner and outer rear walls of the trailer body when the top is in its closed position for traveling.

Another object of our invention is to provide an expandable camping trailer having a trailer body and a substantially rigid, raisable trailer top which is supported on a pair of front arms and a pair of rear arms, each arm having an upper and a lower section connected together so that the arms can be folded into the front and rear ends of the trailer body and wherein the upper sections of either the front pair of arms or the rear pair of arms, or both pairs, may be pivoted toward the other pair of arms so that one end of the trailer top can be raised at a time.

Still another object of our invention is to provide locking means for the support arms which will permit the upper sections of the arms to be pivoted toward the opposite pair of arms while at the same time preventing the arms from being folded in a transverse direction.

A further object of our invention is to provide guide means in the trailer body for the foldable support arms.

A still further object of our invention is to provide spring means for assisting in raising and lowering the trailer top to its upper open and lower closed positions.

Further objects, features and advantages of our invention will be apparent from the following detailed description taken in conjunction with the accompanying drawings wherein a preferred embodiment of our invention is shown for exemplification.

Figure 1:
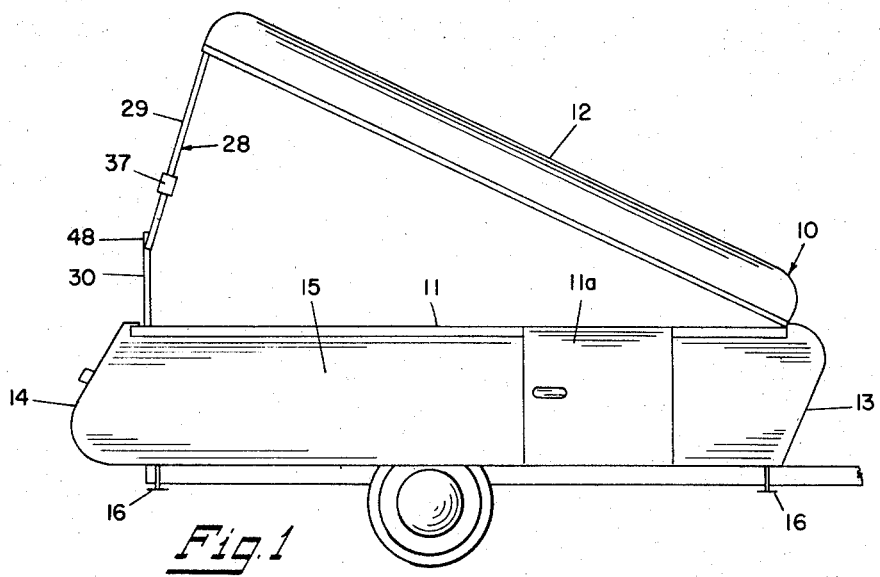
FIG. 1 is a side elevation view of an expandable camping trailer embodying our invention showing the rear end of the trailer top in its open position.
Figure 2:
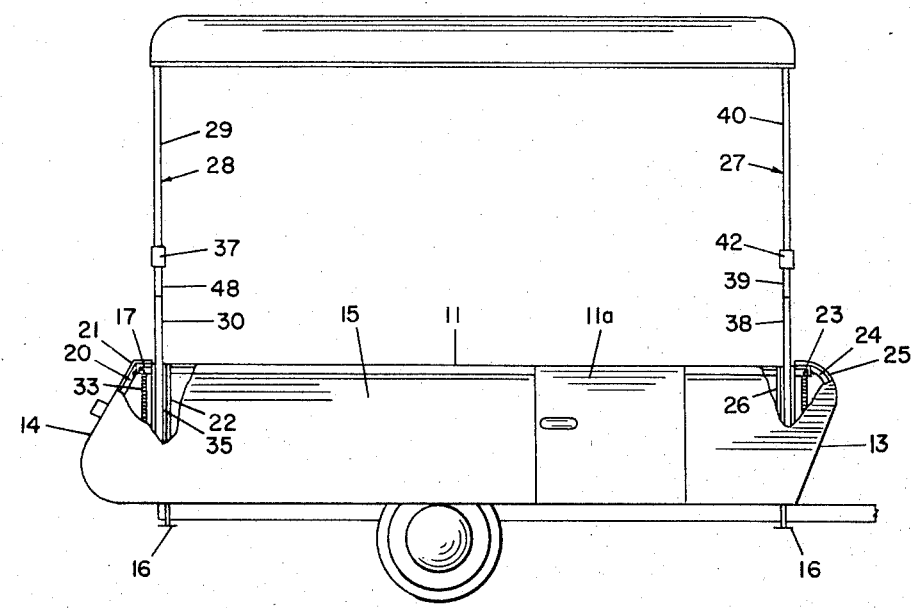
FIG. 2 is a side elevation view of the trailer shown in FIG. 1 with the trailer top in its full open position and wherein portions of sides of the trailer body have been broken away.
Figure 3:
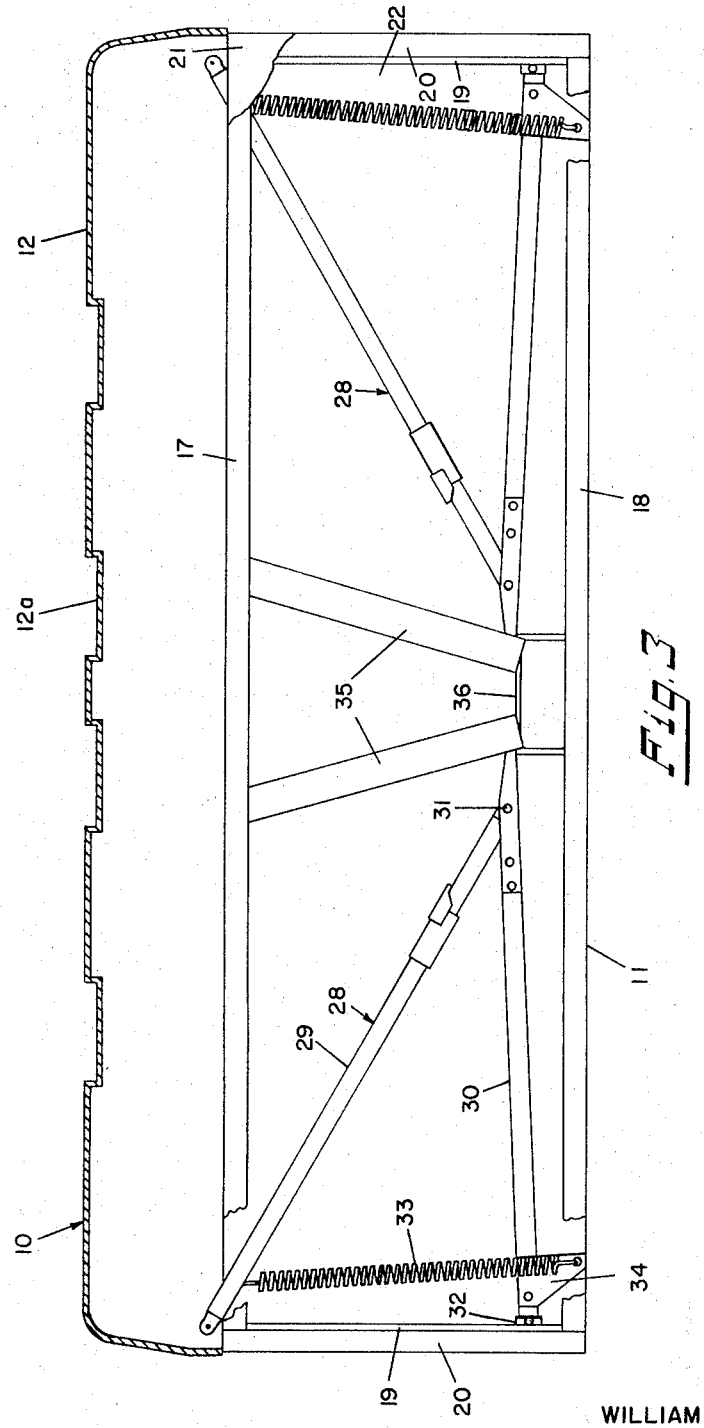
FIG. 3 is an elevation view of the rear end of a portion of the trailer shown in FIG. 1 with the outer rear wall broken away and the rigid top shown in section.

Referring now more particularly to the drawings wherein like numerals refer to like parts throughout the several views, our expandable camping trailer is generally shown at 10. As shown in FIGS. 1–3, the trailer 10 has a wheel supported trailer body 11 and a substantially rigid, raisable top 12. The trailer body 11 has a front end 13 and a rear end 14 and a pair of side walls 15. The front end and rear end of the trailer body 11 are substantially the same except that for aesthetic reasons the front end 13 has a rounded upper portion while the rear end 14 is rounded on the bottom. The front and rear ends of the trailer body 11 are provided with the conventional ground support members 16 for stabilizing the trailer during use.

The structure of the rear end 14 of the trailer body 11 is shown in detail in FIGS. 2 and 3. It has a rectangular welded steel frame comprising upper and lower horizontal cross-members 17 and 18 and upright corner struts 19. These corner struts have been broken away in FIG. 2 in order to show other parts of the trailer. A pair of outwardly bowed rib members 20 are welded to the upper and lower cross-members 17 and 18 for forming the rear end of the trailer. While only two of these bowed rib members 20 are shown in FIG. 3 for simplicity, several more may be required across the end of the trailer for providing the desired rigidity. The outer rear wall 21 is attached to these bowed rib members 20 by riveting or the like. The inner rear wall 22 of the trailer body is spaced inwardly from the outer rear wall 21 as best shown in FIG. 2 and may be formed from wood paneling or the like.

As shown in FIG. 2, the front end 13 of the trailer body 11 also has an upper cross member 23 to which outwardly bowed rib members 24 are attached for supporting the outer front wall 25. The inner front wall 26 is spaced inwardly from the outer front wall 25 for forming a space into which a front pair of extensible support members 27 may be collapsed.

The trailer top 12, shown in FIGS. 1–3, may be formed of any suitable substantially rigid material such as fiber glass, metal or the like, and may be provided with longitudinally or transversely extending strengthening channels such as 12a as shown in FIG. 3. FIG. 3 shows the trailer top 12 in its closed position wherein it rests on the trailer body 11 for traveling. FIG. 1 shows the trailer top 12 with its rear end in open position and its forward end in closed position and FIG. 2 shows the top 12 in its fully opened position.

The front end of the trailer top 12 is supported by a pair of extensible arms 27 and the rear end thereof is supported by a pair of extensible members 28.

The general construction and operation of the rear extensible support arms 28 is shown in FIG. 3. The construction of the forward pair of extensible support arms 27 is generally similar to the rear arms 28 but differs somewhat as will be discussed hereinafter in detail in connection with FIGS. 4–8.

Referring to FIGS. 2 and 3, each of the rear arms 28 comprises an upper section 29 and a lower section 30 connected together in foldable relation by pivot pin 31. The upper arm section 29 is pivotally attached to the rear end of the trailer top 12. The lower end of the lower arm section 30 is pivotally attached in a bracket member 32 which is fixedly attached to corner strut 19. A tension spring 33 is provided for assisting in the raising and lowering of the trailer top 12. The spring 33 is attached to the upper cross frame member 17 and to a transverse plate 34 fixedly attached to the lower section 30 of extensible support arm 28. The upper end of the lower section 30 of the extensible support arms 28 is guided in a substantially U-shaped guide channel 35 which is fixedly attached to cross-member 17 and a lower channel 36. The extensible arms 28 are positioned so that they can be folded down into the trailer body between the outer rear wall 21 and the inner rear wall 22.

A locking member 37 is slidably mounted on the upper section 29 of extensible arm 28 for locking the upper section 29 and the lower section 30 in substantially rigid upright relation for supporting the trailer top 12 as shown in FIG. 2.

The upper and lower sections of extensible arms 27 and 28 are preferably formed of 1" square steel tubing and may be zinc or chrome plated as desired.

Figure 4:
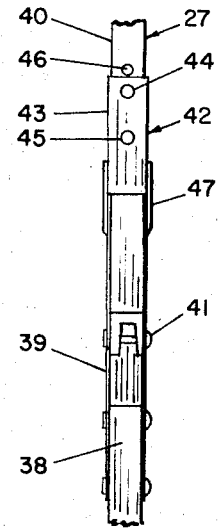
FIG. 4 is an enlarged fragmentary elevation view of the inwardly facing side of one of the front support members of the trailer shown in FIG. 1.
Figure 5:
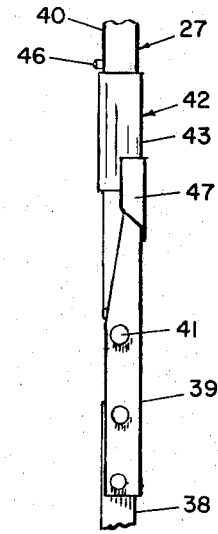
FIG. 5 is an elevational view taken at a right angle to the support member shown in FIG. 4.

FIGS. 4 and 5 show the detailed construction of the pair of forward support arms 27. The lower section 38 of each of support arms 27 has a three-sided channel 39 riveted at its upper end. The channels 39 of the front pair of arms 27 are open on their outwardly facing sides when the arms are in their upright extended position to permit the arms 27 to be folded into the trailer body. The lower end of upper section 40 of arm 27 is pivotally attached in foldable relation in channel 39 by a pivot pin 41.

A locking member 42 has an upper rectangular portion 43 encircling the upper section 40 of each of arms 27. The rectangular portion 43 has a pair of holes 44 and 45 therein for receiving a spring biased detent pin 46. The locking member 42 has a three-sided portion 47 depending from rectangular portion 43 which can be moved into locking engagement against the sides of the channel portion 39 of the lower section 38 of arms 27. The locking member 42 may be held in an unlocking position by moving it up until pin 46 is engaged in hole 45 for folding arms 27 to place the trailer top 12 in its closed position. Locking member 42 may be slid down on upper section 40 of arm 27 so that depending portion 47 of member 42 is moved into locking engagement with the channel 39 of the lower section 38 of arm 27 for maintaining the upper and lower sections of arms 27 in rigid relation for supporting the trailer top 12 in its open position.

Figure 6:
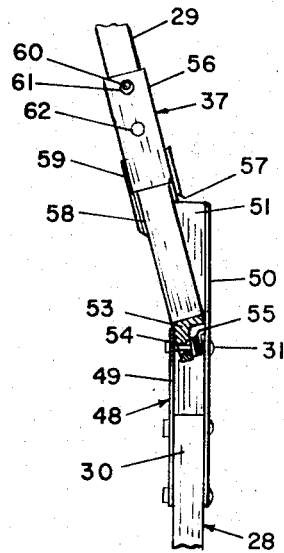
FIG. 6 is an enlarged fragmentary side elevation view of one of the rear support members of our trailer in a partially unlocked position showing the upper section thereof pivoted forwardly of the lower section as in FIG. 1.
Figure 7:
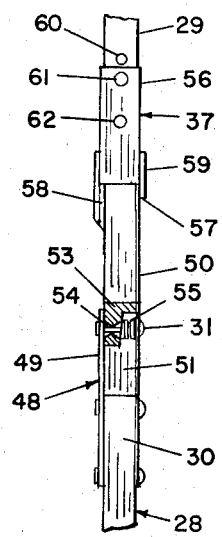
FIG. 7 is a side view of the support member of FIG. 6 showing the upper and lower sections thereof secured in rigid relation by the locking member.
Figure 8:
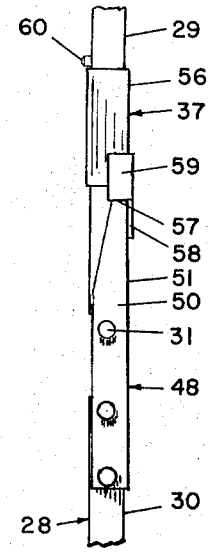
FIG. 8 is a rear view of the support member of FIG. 6 showing the upper and lower sections thereof secured in rigid relation by the locking member.

FIGS. 6–8 show the detailed construction of rear support arms 28. Each of arms 28 has a lower section 30 having a three-sided channel 48 riveted thereto. Each of channels 48 is open on its outwardly facing side to permit the arms 28 to be folded inwardly as shown in FIG. 3. Channels 48 differ from channels 39 of front arms 27 in that, as shown in FIGS. 6 and 7, the forward facing side 49 of channel 48 is substantially shorter than its other two sides 50 and 51. This permits the upper arm section 29 which is attached in channel 48 by pin 31 to be pivoted or rocked forwardly as seen in FIGS. 1 and 6. Referring to FIGS. 6 and 7, the bottom tip 53 of upper arm section 29 is substantially narrower in width than channel 48 and has a hole 54 therein which has beveled ends. The beveled hole 54 permits the upper arm section 29 to be pivoted or rocked forwardly on the pin 31 as well as pivoted or folded about the axis of pivot pin 31. A small compression spring 55 may be provided on pin 31 to maintain a tight joint.

The locking member 37 for the rear arms 28 is also different than the locking member 42 of the front pair of arms 27. The rectangular portion 56 thereof is the same as the rectangular portion 43 of locking member 42 but its depending portion 59 has a cut-out portion 57 as shown in FIGS. 6–8 to permit the upper arm section 29 to be pivoted forwardly as shown in FIG. 6 while, at the same time, the base 58 of the depending portion 59 prevents the upper arm section 29 from pivoting about the axis of pivot pin 31. When the locking member 37 is positioned so that detent pin 60 is engaged in upper hole 61 of the locking member as shown in FIG. 6, the base 58 of the three-sided depending portion 59 remains in engagement against the base side 51 of the three-sided channel 48 as shown in FIGS. 6–8.

When locking member 37 is positioned so that detent pin 60 is in the bottom hole 62 the locking member 37 will be held in an upper unlocking position so that arm sections 29 and 30 can be folded about pin 31 into the trailer body as shown in FIG. 3 when the top 12 is to be closed for traveling and storage.

When the locking member 37 is in the position shown in FIGS. 7 and 8 the detent pin 60 engages the top edge of locking member 37 and the arm sections 29 and 30 are held in rigid relation by the locking member 37 for supporting the trailer top 12 in its full open position shown in FIG. 2.

It will be noted that because the extensible support arms 27 and 28 are folded into the ends 13 and 14 of the trailer body 11, the door 11a in the side of the trailer body is unobstructed by the support arms. This unique feature of our trailer permits the door 11a to be opened when the trailer top 12 is open or closed. Thus, for example, when stopping for lunch in a wayside enroute to camping grounds, the door 11a may be opened to gain access to the ice box in the trailer without having to raise the trailer top. The ice box (not shown) in our trailer is positioned adjacent the door 11a for easy access during travel.

The opening and closing of our trailer is extremely simple and can be performed by one person. To set up the trailer, the conventional ground support members 16 are first dropped to rigidly support the trailer body. In the trailer 10 shown, the rear end of the top 12 is raised first. This is done by merely lifting-up on the rear end of the top 12. The tension springs 33 exert an upward force on plates 34 and thus cause the arms 28 to be pivoted upwardly to assist in the raising of the top 12. The rear support arms 28 are thus unfolded about pivot pin 31 into a substantially upright position. Since the front end of the trailer top 12 is still in its closed position, as shown in FIGS. 1 and 6, the upper section 29 of arms 28 are pivoted forwardly. The detent pin 60 on each of the arms 28 is then depressed to release the locking member 37 whereby the locking member can then be slid down on upper arm section 29 until the detent pin 60 is engaged in hole 61. As seen in FIG. 6, when locking member is in this position the arms 28 are prevented from collapsing about the axis of pivot pin 31.

The person setting up the trailer then lifts the front end of the trailer top 12 to the open position shown in FIG. 2. The tension springs attached to the forward pair of arms 27 assist in raising the front end of the trailer top to its open position. The locking member 42 on each of the front arms 27 are then moved down into the locking position shown in FIGS. 4 and 5. The front arms 27 are thus held in rigid relation.

The rear support arms 28 which are now in the straight upright position shown in FIG. 2, are then locked in rigid relation by depressing the detent pin 60 and moving the locking member 37 into the locking position shown in FIG. 8.

The trailer 10 is provided with the usual canvas walls (not shown) to close the space between the trailer body 11 and the open trailer top 12.

In closing the trailer the above mentioned steps are performed in reverse, that is, the front end of the trailer top 12 is first lowered to its closed position, as shown in FIG. 1, and the rear end of the top is then lowered to its closed position. The front and rear tension springs prevent the top 12 from slamming down on the trailer body 11.

While the upper sections 29 of rear arms 28 are shown as being pivotable toward the front end 13 of the trailer body whereby the rear end of the trailer top must be opened first, it is understood that instead, the front pair of arms 27 can be designed so that their upper sections 40 can be pivoted toward the rear end 14 of the trailer in which case the front end of the top 12 would be opened first. Further, the upper sections of both the front pair and the rear pair of support arms could be made pivotable toward opposite ends of the trailer in which cause either end of the top 12 could be raised first.

It is apparent from the foregoing that we have provided a unique, hard-top, expandable camping trailer which can be easily set up by one person.

We have also provided a hard-top expandable camping trailer wherein the support arms for the top are folded inside of the trailer body during travel and storage. These arms are thus hidden from view to give the trailer a stream-lined appearance and the arms are protected against damage by the steel frame of the trailer.

Furthermore, by having the support arms foldable into the front and rear ends of the trailer body, the door in the side wall of the trailer body may be opened without having to raise the top of the trailer.

It is understood that our invention is not confined to the particular construction and arrangement of parts herein illustrated and described, but embraces all such modified forms thereof as may come within the scope of the following claims.

We claim:
1. An expandable camper trailer comprising:
 (a) a wheel supported trailer body having a front end, a rear end, and a pair of side walls,
 (b) a substantially rigid trailer top mounted on said trailer body for movement between an upper open position for use and a lower closed position for traveling,
 (c) a pair of extensible front support arms and a pair of extensible rear support arms attached to said trailer body and to said top for raising and lowering said top between said open and closed positions and for rigidly supporting said top in said open position, each of said arms comprising an upper and a lower section connected together in foldable relation, said front and rear support arms being collapsible into the front and rear ends of the trailer body, respectively, perpendicular to the path of travel of the trailer,
 (d) the upper sections of each of said arms of at least one pair of said arms being pivotable in a direction toward the other of said pair of arms parallel to the path of travel of the trailer whereby the end of said trailer top supported by said one pair of arms may be raised to said open position while the other end of said trailer top is in said closed position to permit opening of one end of said trailer top at a time by one person, and
 (e) means for locking each of the arms of said one pair of arms in rigid relation when said top is in said open position.

2. The expandable camper trailer as specified in claim 1 wherein the upper end of said lower section of each of said one pair of arms is in the form of a three-sided channel, one side of said channel being substantially shorter than the other two, the lower end of the upper section of each of said one pair of arms being connected in foldable relation in said channel by a pin for swinging said upper section transversely of the longitudinal axis of said trailer, said upper section being pivotable on said pin toward the other said pair of support arms whereby the end of said trailer top supported by said one pair of pivotable support arms can be raised to its open position while the other end of said trailer top is in its closed position, and wherein said locking means comprises a locking member slidably mounted on the upper section of each of said one pair of arms, said locking member having a portion adapted to be moved into engagement against at least two sides of said channel for releasably locking said upper and lower sections in rigid relation.

3. The expandable camper trailer as specified in claim 1 including spring means attached to the trailer body and the lower section of each of said foldable arms for assisting a person in raising and lowering said trailer top to said open and closed positions.

References Cited

UNITED STATES PATENTS 3,184,261    5/1965    Young      296—26
3,315,421    4/1967    Roy      296—27

BENJAMIN HERSH, *Primary Examiner.*

PHILIP GOODMAN, *Examiner.*